Sept. 2, 1930.  W. KANNING ET AL  1,774,889
WASHOUT PLUG
Filed Jan. 10, 1928
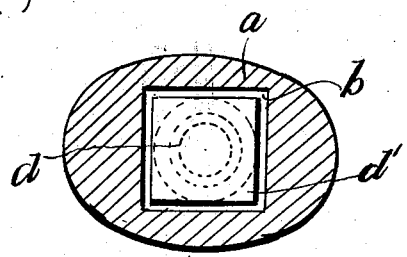
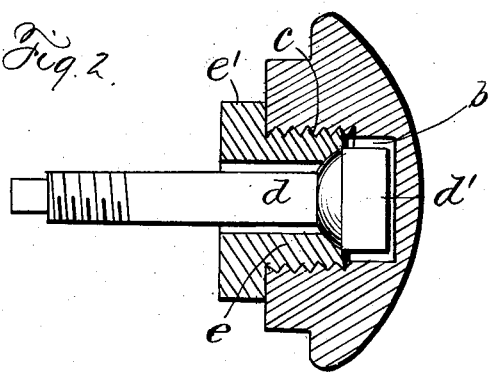

Patented Sept. 2, 1930

1,774,889

UNITED STATES PATENT OFFICE

WILHELM KANNING, OF COLOGNE, AND OSKAR BUSCHMANN, OF COLOGNE-NIPPES, GERMANY

WASHOUT PLUG

Application filed January 10, 1928, Serial No. 245,802, and in Germany January 10, 1927.

This invention relates to wash-out plugs for locomotive, marine and other boilers, and more particularly to jointed plugs, and it is an object of the invention to provide a plug of this type in which the joint is protected from the excess of boiler water. To this end, the joint is arranged inside the body of the plug.

Various types of wash-out plugs have already been proposed, and it has also been proposed to connect the bolt and the body of the plug by a joint.

The invention in which a plug having a body and a bolt which is movable with respect to the body and may be exchangeable, are provided, is distinguished from the existing types of plugs in that the joint which may be a ball-and-socket joint, is arranged within the body of the plug and consequently protected from the action of the boiler water. Another important feature of this arrangement is that the bolt does not extend through the body and so the packing required in existing types between the bolt and the body, is dispensed with.

In the drawing accompanying this specification a plug embodying the present invention is illustrated diagrammatically by way of example.

In the drawing

Fig. 1 is an end elevation of the plug,

Fig. 2 is an axial section.

Referring now to the drawing, $a$ is the body of the plug, $b$ is a square cavity in the body, and $c$ is a parallel threaded hole in the body adjoining the cavity $b$. $d$ is the bolt of the plug having at its inner end a square head $d'$ fitting the cavity $b$ with some clearance, and a spherical seat intermediate the shank and the square head. $e$ is a cap nut fitting the thread $c$ and surrounding the shank of the bolt with some clearance, and $e'$ is a square on the outside of the cap nut.

The square recess $b$ prevents rotation of the bolt in the body $a$, the bolt $d$ is readily exchanged without interfering with any parts of the body, and the bolt is free to assume any position with respect to the body $a$, due to the spherical connection of the parts.

We claim:

1. A wash-out plug comprising a body, a bolt, a spherical face on said bolt, and a threaded sleeve inserted in said body and having a spherical cavity fitting said face.

2. A wash-out plug comprising a body defining a square cavity, a bolt having a square head adapted to be inserted in said cavity, a spherical face on said bolt, and a threaded sleeve inserted in said head and having a spherical cavity fitting said face.

In testimony whereof we affix our signatures.

WILHELM KANNING.
OSKAR BUSCHMANN.